Aug. 26, 1941.  E. M. CLAYTOR  2,254,115
OVERDRIVE CONTROL
Filed May 2, 1940
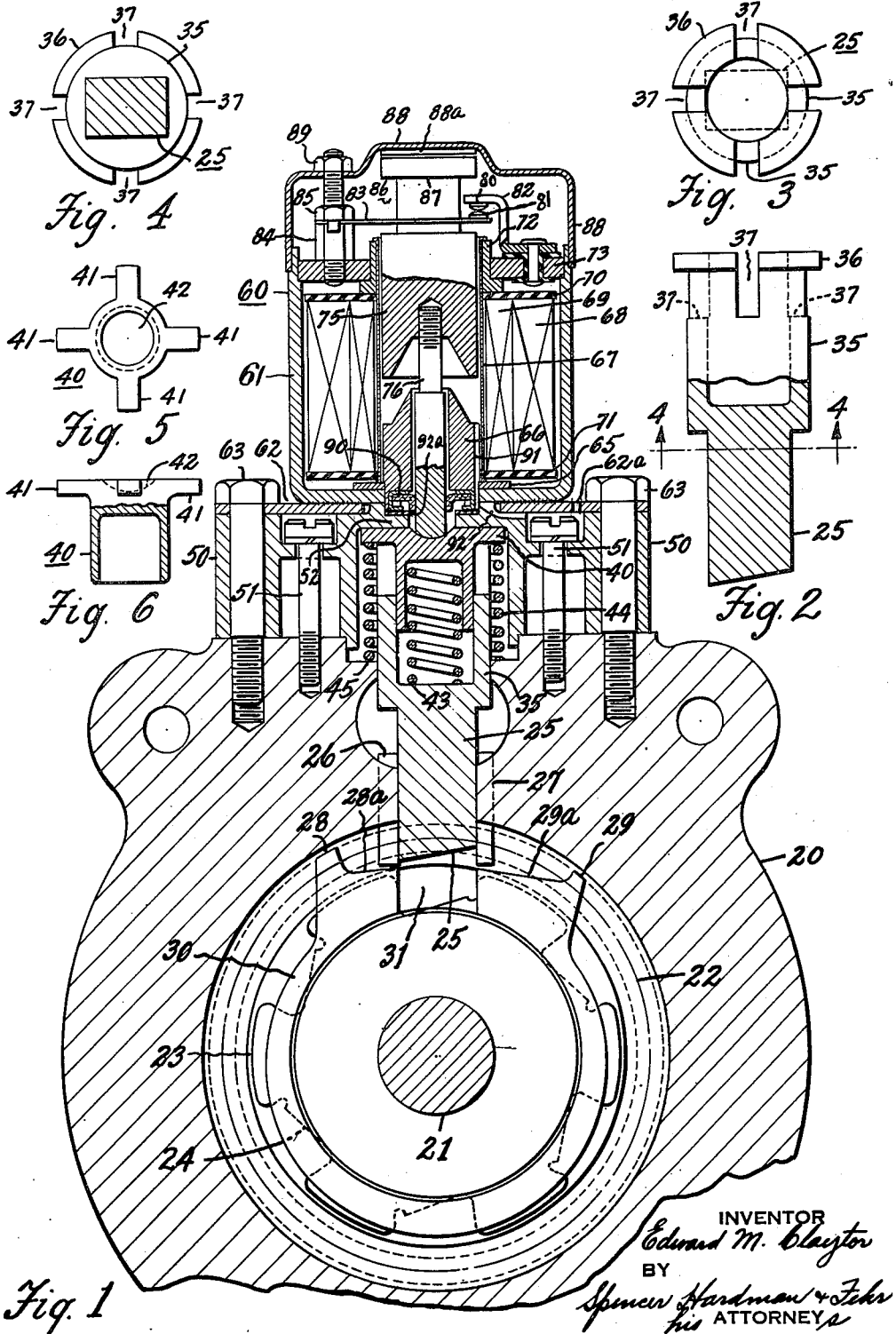
INVENTOR
Edward M. Claytor
BY
Spencer Hardman & Fehr
his ATTORNEYS Patented Aug. 26, 1941

2,254,115

UNITED STATES PATENT OFFICE 2,254,115

OVERDRIVE CONTROL

Edward M. Claytor, Anderson, Ind., assignor to General Motors Corporation, Detroit, Mich., a corporation of Delaware Application May 2, 1940, Serial No. 333,005

5 Claims. (Cl. 188—163)

This invention relates to overdrives for automobiles and more particularly to the type of overdrive in which the sun gear, having a locking ring adapted to be engaged by a pawl normally urged out of locking position by a spring and moved into locking position by an electromagnet device or solenoid. The solenoid armature is not rigidly connected with the pawl but operates through a compression spring to move the pawl first into engagement with the sun gear blocker plate. This expedient is required, since a pawl blocker plate prevents movement of the pawl into locking position until such time that there is a reversal of torque in the overdrive. Therefore, in this type of overdrive control there are two springs associated with the pawl and with the electromagnet, namely: (1) the spring which normally retains the pawl out of engagement with the sun gear locking ring, and (2) the spring which transmits motion from the solenoid armature to the pawl to cause the latter to move first into engagement with the blocker plate, and finally into engagement with the sun gear locking ring after the blocker plate has disengaged the pawl.

In connection with an overdrive control of this type, it is an object of my invention to provide a construction of parts which will facilitate assemblage with other parts of the automobile and particularly it is an object to provide for the assemblage of the pawl and the two springs with the overdrive housing in advance of securing the solenoid in position. My invention contemplates fastening the pawl and spring in position upon the overdrive housing so that this assembly can be complete independently of the solenoid which may be attached at some time later during the construction of the automobile. Furthermore, my invention provides for removal of the solenoid for repairs or replacement independently of assemblage of pawl and spring.

Further objects and advantages of the present invention will be apparent from the following description, reference being had to the accompanying drawing wherein preferred embodiments of the present invention is clearly shown.

In the drawing:

Fig. 1 is a vertical sectional view through an overdrive control mechanism constructed in accordance with the present invention.

Fig. 2 is partly an elevation of the sun gear locking pawl and is partly a sectional view in the same plane as the sectional view shown in Fig. 1.

Fig. 3 is a plan view of the pawl.

Fig. 4 is a sectional view of line 4—4 of Fig. 2.

Fig. 5 is a plan view of a sleeve shown in Fig. 1.

Fig. 6 is in part a side elevation and is partly in section, the section being taken in the same plane as Fig. 1.

Referring to the drawing, a housing 20 which encloses the overdrive mechanism supports an engine driven shaft 21 around which is journalled a sun gear 22 which rotates with the shaft 21 when the overdrive is not operating and which may be held stationary when the overdrive operates. Gear 22 is fastened to a locking ring 23, provided with notches 24 for receiving a locking pawl 25 when it is urged downwardly by the solenoid to be described. The pawl 25 slides between ways 26 and 27 provided by the frame 20. These ways are normally engaged, respectfully, by either of lugs 28 and 29 which are part of a pawl blocker plate 30 which includes surfaces 28a and 29a either of which normally would be engaged by the pawl 25 when the pawl is urged downwardly, thereby preventing the pawl from entering a notch 24 of the locking ring 23. However, when there is reversal of torque through the overdrive resulting from the decreasing of engine speed below the corresponding vehicle speed, the blocker plate 30 will move into the position shown in Fig. 1, wherein the space 31 between its pawl engaging surfaces 28a and 29a registers with the pawl 25 so that, in the event that the pawl is being urged downwardly, it will quickly descend into one of the notches 24 as the locking ring 23 rotates.

The pawl 25 includes a tubular upper end portion 35, providing a flange 36 and cross-slots 37. The tubular portion 35 of pawl 25 is telescopically engaged by a tubular button 40 provided by lugs 41 which are received by the cross-slots 37 in pawl 25. Button 40 is provided with a recess 42 in its top surface. Motion is transmitted from the button 40 to the pawl 25 by a spring 43 housed within the button 40 and the tubular extension 35 of the pawl 25. A spring 44 is confined between a surface 45 of housing 20 and the flange 36 of pawl 25 and the lugs 41 of button 40. The springs 43 and 44, pawl 25 and button 40 are retained as shown by a frame 50, attached by screws 51 to the housing 20. As shown, the spring 44 is confined in a state of compression, thus urging the button 40 and the pawl 25 against the under surface of the flange 52 of the frame 50. Thus, the pawl, buttons and springs are secured to the housing 20 as a sub-assembly independently of attachment of any means for actuating the pawl downwardly.

The means for actuating the pawl downwardly comprises a solenoid unit 60 which includes a magnetizable cup-shaped member 61 welded to a base plate 62 adapted to fit upon the upper surface of the frame 50 and to be secured thereto and to the housing 20 by screws 63. The magnet cup 61 supports a magnetizable washer 65 and a magnetizable stationary core 66 which is surrounded by a non-magnetizable tube 67 surrounded by magnet coils 68 and 69 supported between insulating discs 70 and 71. The non-magnetizable tube or sleeve 67 extends through a magnetizable bushing 72 fastened to a magnetizable apertured disc 73, attached to the magnetizable cup 61. The sleeve 67 guides a movable armature 75 which is supported by a rod 76 the lower end of which rests upon the button 40 and is received by the recess 42 therein.

The magnet coils 68 and 69 are connected with a current source to create a magnetic field for attracting the armature 75 downwardly toward the core 66 in order to urge the pawl 25 into locking engagement with the sun gear locking ring 23. After the air gap between armature 75 and the core 66 has been materially diminished, only one of these magnet coils need be excited to retain the armature in attracted position. The coil 68, which is the armature attracting coil, comprises a relatively small number of turns of relatively coarse wire and the coil 69, which is the armature holding coil, comprises a relatively larger number of turns of fine wire. The circuit of the attracting coil 69 is controlled by a switch including contacts 80 and 81 mounted, respectively, upon a bracket 82 and a leaf spring blade 83 supported by the disc 73. Since the circuit of the magnet coil 69 includes a ground connection with the storage battery, one lead of the coil 69 is connected with the bracket 82, which is insulatingly supported, and the blade 83 is connected with ground through a stud 84 attached to the disc 73 and receiving a nut 85 which clamps the blade 83 to the stud.

The armature 75 has a wide groove 86 into which a part of the blade 83 extends so that the shoulder 87 of the armature 75 will engage the blade 83 after the armature 75 has approached relatively close to the core 66. The movement of the armature 75 therefore separates the contacts 80 and 81 and breaks the connection between the current source and the armature attracting magnet coil 69. The circuit of the coil 68 remains completed to hold the armature 75 in attracted position until such time as the circuit of the coil 68 is interrupted when it is desired to come out of overdrive. When the circuit of the coil 68 is broken by the opening of a control switch (not shown), spring 45 becomes operative to retract the latch 25 and will move it and the button 40 to normal position shown in Fig. 1; and, at the same time, upward movement is imparted to armature 75 to restore it to normal position by said spring 45. During its upward movement, armature 75 may over travel and strike a leather bumper 88a secured on the inside of a cover 88. There is a slight clearance between the bumper 88a and the upper end of armature 75 in the normal position of the latter.

The retraction of latch 25 is facilitated by momentarily interrupting engine torque as provided for according to the disclosure of my application Serial No. 290,356 filed August 16, 1939.

The lower end of the rod 76 extends through a leather or felt washer 90 which prevents entrance of oil from the overdrive into the magnet structure. However, the interior of the magnet is vented by providing the core 66 with a slot 91, the frame 50 with a slot 92 and the plate 62 with a vent 62a. Neoprene washer 92a prevents oil from entering the ventilating slot 91.

The upper end of the solenoid unit 60 is enclosed by a cover 88 apertured to receive the threaded end of stud 84. The cover is secured in position by nut 89 received by the stud 84.

From the foregoing description of the construction of the overdrive control mechanism embodying the present invention, it is apparent that I have provided for the assemblage of the overdrive housing with the sun gear locking pawl and the springs which control this pawl, said assemblage being completed independently of any device which is employed to move the pawl toward the sun gear locking ring. This assemblage, of course, may be completed at the time the overdrive is assembled upon the automobile. Later on the assembly, the solenoid sub-assembly, which is a complete unit in itself, may be added to the overdrive and attached thereto by the screws 63. Obviously, the solenoid unit 60 may be removed for repairs or replacement without requiring the disassembling of other parts of the overdrive control mechanism.

While the embodiment of the present invention as herein disclosed, constitute preferred forms, it is to be understood that other forms might be adopted, all coming within the scope of the claims which follow.

What is claimed is as follows:

1. An overdrive control mechanism comprising the sub-assembly of the overdrive housing, a sun gear locking pawl, a spring for urging the pawl away from the sun gear, and a frame for retaining said pawl and spring upon the housing; and a pawl actuating unit sub-assembly for moving the pawl into engagement with the sun gear and adapted to be mounted upon the housing and, when so mounted, to locate its pawl actuating part in operative relation to the pawl.

2. An overdrive control mechanism comprising the sub-assembly of the overdrive housing, a sun gear locking pawl, a spring for urging the pawl away from the sun gear, a spring for applying a yielding force to move the pawl toward the sun gear, and a frame for retaining said pawl and springs upon the housing; and a pawl actuating unit sub-assembly for moving the pawl into engagement with the sun gear and adapted to be mounted upon the housing and, when so mounted, to locate its pawl actuating part in operative relation to the second mentioned spring.

3. An overdrive control mechanism comprising the sub-assembly of the overdrive housing, a sun gear locking pawl, a spring for urging the pawl away from the sun gear, and a frame for retaining said pawl and spring upon the housing; and a solenoid unit for moving the pawl into engagement with the sun gear and adapted to be mounted upon the housing and, when so mounted, to locate its armature actuated part in operative relation to the pawl.

4. An overdrive control mechanism comprising the sub-assembly of the overdrive housing, a sun gear locking pawl, a spring for urging the pawl away from the sun gear, a spring for applying a yielding force to move the pawl toward the sun gear, and a frame for retaining said pawl and springs upon the housing; and a solenoid unit for moving the pawl into engagement with the sun gear and adapted to be mounted upon the housing and, when so mounted, to locate its armature actuated part in operative relation to the second mentioned spring.

5. An overdrive control mechanism comprising the sub-assembly of the overdrive housing, a sun gear locking pawl, a spring for urging the pawl away from the sun gear, a button telescopically engaged by the pawl, a spring for transmitting movement to the pawl from the button to urge the pawl toward the sun gear and a frame for retaining the pawl button and springs in assembled relation with the housing; and a pawl actuating unit sub-assembly for moving the pawl into engagement with the sun gear and adapted to be mounted upon the housing and, when so mounted, to locate its pawl actuating part in operative relation to the button.

EDWARD M. CLAYTOR.